Patented Nov. 11, 1930

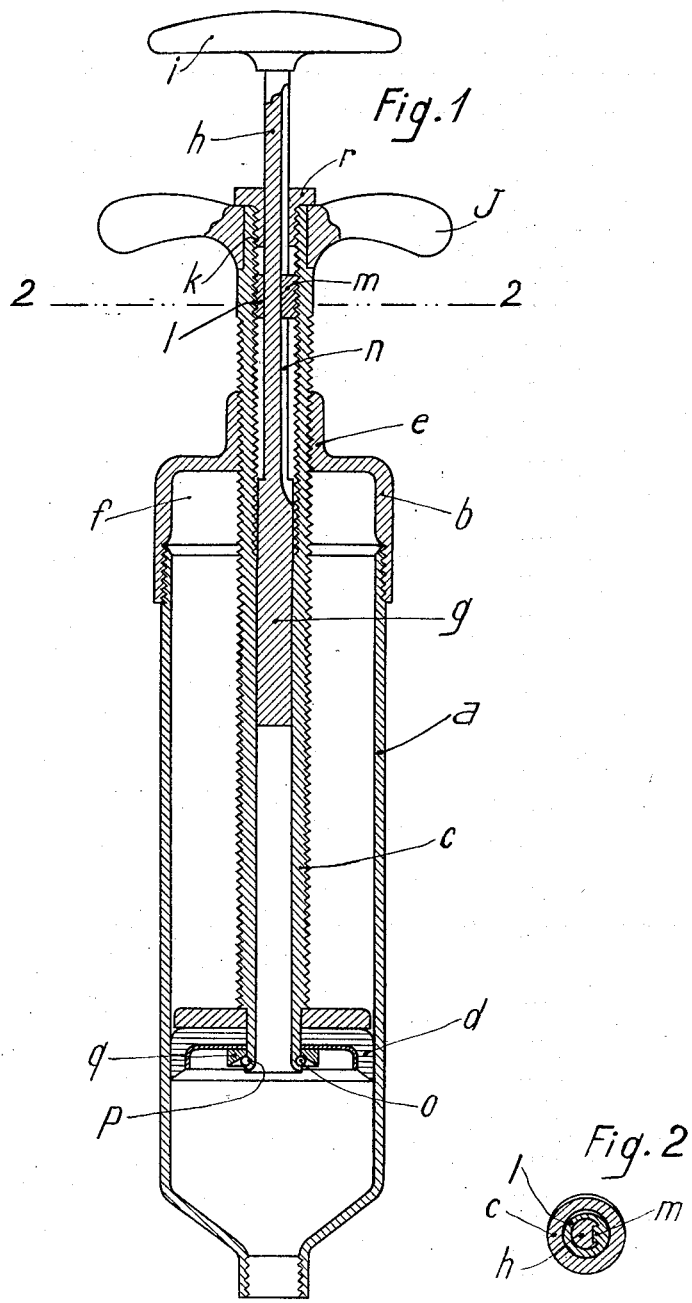

1,781,604

UNITED STATES PATENT OFFICE

JULIEN EUGÈNE MARIUS SEGUIN, OF PARIS, FRANCE

LUBRICATING GUN

Application filed September 24, 1929, Serial No. 394,911, and in France October 6, 1928.

My invention relates to improvements in high pressure grease guns, and the general object of the invention is to provide a device of the type described which gives, with minimum muscular energy, a pressure surpassing considerably that which is possible to obtain with similar apparatuses of the screw type known in the prior art.

My improved gun is provided with a pump body and a piston furnished with a threaded rod screwing into the closing cap of the pump body and is characterized by the fact that the threaded rod of the piston is tubular and a small high pressure piston is slidably disposed on said rod.

One improvement resides in the fact that the rod of the small high pressure piston slides through a nut, in which said rod is locked in the direction of rotation whereas the said nut is screwed in the upper tapped part of the tubular rod of the large piston.

My invention will be more readily understood by those skilled in the art to which my invention relates in the following description taken in connection with the accompanying drawing in which—

Fig. 1 is an axial section taken through my improved pump; and

Fig. 2 is a section along the line 2—2 of Fig. 1.

Referring to the drawing more in detail, the cylindrical pump body ($a$) is closed at its upper part by a cap $b$ screwed thereon. The rod $c$ of the large piston $d$ is screwed into a central boss $e$ of the cap $b$. Said rod is threaded with a high pitch thread. The internal wall $f$ of the cap $b$ is of a diameter equal to that of the pump body $a$. The height of said wall is such that the piston $d$ may be lodged therein during filling of the body $a$. Such disposition eliminates introduction of piston $d$ in the body $a$ after filling thereof.

The threaded rod $c$ is tubular so as to constitute a small pump body in the interior of which slides a small piston $g$. Said small piston is extended by a rod $h$ surmounted by a handle $i$. A handle $j$ is also mounted on the threaded rod $c$ for manipulating the large piston $d$.

The upper tubular part of the rod $c$ is tapped at $k$ over a certain distance. A nut $l$ is screwed into said tapped portion and is apertured centrally. Said nut is traversed by the rod $h$ of the small piston and provided with a key $m$ sliding in a groove $n$ provided in the rod $h$ of the small piston.

The large piston $d$ is leather covered or fitted with any other flexible material providing good compression. The assembly of leather and washers composing the piston is fixed on the rod $c$ by means of a guard $o$ of steel wire, lodged in a groove $p$ provided at the base of the rod $c$. A washer $q$ having a tapered bore prevents any accidental tearing off of the guard $o$. A nipple $r$ closes the upper part of the tubular rod $c$ and maintains the rod $h$ of the small piston $g$.

The operation of the gun is as follows:

The pump body $a$ being filled with lubricant, it is merely necessary, after having put the cap $b$ in place, to turn the rod $c$ in the boss $e$. The piston $d$, by descending, automatically takes its place in the pump body and compresses the lubricant with which it enters into contact. Said lubricant pushed into the interior of the tubular rod $c$ shoves the small piston $g$ to the end of its stroke. All thrust produced from that moment on on the handle $i$ of said small piston determines on the interior of the pump body a pressure which can attain a considerable value, varying in accordance with the thrust and the surface of the small piston. In fact, the pressure obtained for a given force being inversely proportional to the surface of the piston, said pressure will be as much greater as the surface of piston $g$ is made smaller.

It is to be noticed that due to this disposition, the small piston $g$ is always shoved back in readiness by the shoving back of the lubricant without the aid of any return spring. In addition, I eliminate any suction and consequently all vacuum on the interior of the apparatus which as a result does away with checks and prevents unpriming and other entry of air injurious to good lubricating operations.

When the lubricating is possible with direct pressure on the small piston, subsequent to the plugging up of a grease cup or for other reasons, it suffices then to unscrew the rod $h$ by means of its handle $i$. This movement is communicated by the groove $n$ and the key $m$ to the nut $l$. Said nut, by screwing in the tapped part $k$ of the tubular rod $c$ bears on the piston $g$. The lubricant then becomes subjected to an enormous pressure which allows lubrication to be effected under all conditions.

Having described my invention what I claim as new and desire to secure by Letters Patent is:

1. A lubricating gun comprising a pump body, a piston slidably mounted in said body, a hollow piston rod for said piston, a second smaller piston slidably mounted in said rod, means for manually reciprocating said smaller piston including a piston rod, and a nut screwed into said first piston rod feathered to said second piston rod and having means for abutting said smaller piston at the end of its stroke when said piston rod is rotated.

2. A lubricating gun comprising a pump body, a piston slidably mounted in said body, a hollow piston rod for said piston, a second smaller piston slidably mounted in said rod, means for manually reciprocating said smaller piston including a piston rod, a nut screwed into said first piston rod, and a key on said nut adapted to engage a keyway in said second named piston rod, said nut having means for abutting said smaller piston at the end of its stroke when said piston rod is rotated.

In testimony whereof I hereunto affix my signature.

JULIEN EUGÈNE MARIUS SEGUIN.